(12) United States Patent
Belelie et al.

(10) Patent No.: US 8,939,565 B2
(45) Date of Patent: Jan. 27, 2015

(54) EMULSIFIED CURABLE OLIGOMER-BASED INKS FOR INDIRECT PRINTING METHOD

(71) Applicant: Xerox Corporation, Norwalk, CT (US)

(72) Inventors: Jennifer L. Belelie, Oakville (CA); Daryl W. Vanbesien, Burlington (CA); Barkev Keoshkerian, Thornhill (CA); Michelle N. Chretien, Mississauga (CA); Marcel P. Breton, Mississauga (CA); Naveen Chopra, Oakville (CA)

(73) Assignee: Xerox Corporation, Norwalk, CT (US)

( * ) Notice: Subject to any disclaimer, the term of this patent is extended or adjusted under 35 U.S.C. 154(b) by 109 days.

(21) Appl. No.: 13/746,864

(22) Filed: Jan. 22, 2013

(65) Prior Publication Data

US 2014/0204161 A1    Jul. 24, 2014

(51) Int. Cl.
| | |
|---|---|
| *C09D 11/34* | (2014.01) |
| *B41J 2/005* | (2006.01) |
| *C09D 11/00* | (2014.01) |
| *B41J 11/34* | (2006.01) |
| *B41J 2/01* | (2006.01) |

(52) U.S. Cl.
CPC ............... *B41J 2/0057* (2013.01); *B41J 11/34* (2013.01); *C09D 11/00* (2013.01); *B41J 2002/012* (2013.01)
USPC .............................. 347/99; 347/100; 347/103

(58) Field of Classification Search
USPC ...................... 347/95, 99, 100, 103
See application file for complete search history.

(56) References Cited

U.S. PATENT DOCUMENTS

| | | | |
|---|---|---|---|
| 5,389,358 A | 2/1995 | Wu et al. | |
| 5,389,958 A * | 2/1995 | Bui et al. | 347/103 |
| 8,142,006 B2 * | 3/2012 | Yamashita et al. | 347/100 |
| 8,246,158 B2 * | 8/2012 | Ageishi et al. | 347/103 |
| 2008/0220362 A1 | 9/2008 | Moore et al. | |
| 2009/0231406 A1 * | 9/2009 | Yamashita et al. | 347/103 |
| 2012/0092426 A1 * | 4/2012 | Chopra et al. | 347/88 |
| 2012/0123040 A1 | 5/2012 | Keoshkerian et al. | |

* cited by examiner

*Primary Examiner* — Huan Tran
(74) *Attorney, Agent, or Firm* — Pillsbury Winthrop Shaw Pittman LLP

(57) ABSTRACT

A method of printing an image to a substrate includes applying an aqueous inkjet ink onto an intermediate receiving member using an inkjet printhead, optionally spreading the ink onto the intermediate receiving member, inducing a property change of the ink, and transferring the ink to a substrate, wherein the ink includes a curable oligomer. A method of printing an image to a substrate includes applying an aqueous inkjet ink onto an intermediate receiving member using an inkjet printhead, optionally spreading the ink onto the intermediate receiving member, inducing a property change of the ink, and transferring the ink to a substrate, wherein making the ink includes forming an aqueous mixture by adding a mixture of oligomers and a surfactant to a reactor containing a mixture of a humectant and an aqueous vehicle, heating and stirring the aqueous mixture, and homogenizing the aqueous mixture, forming the ink.

19 Claims, 1 Drawing Sheet

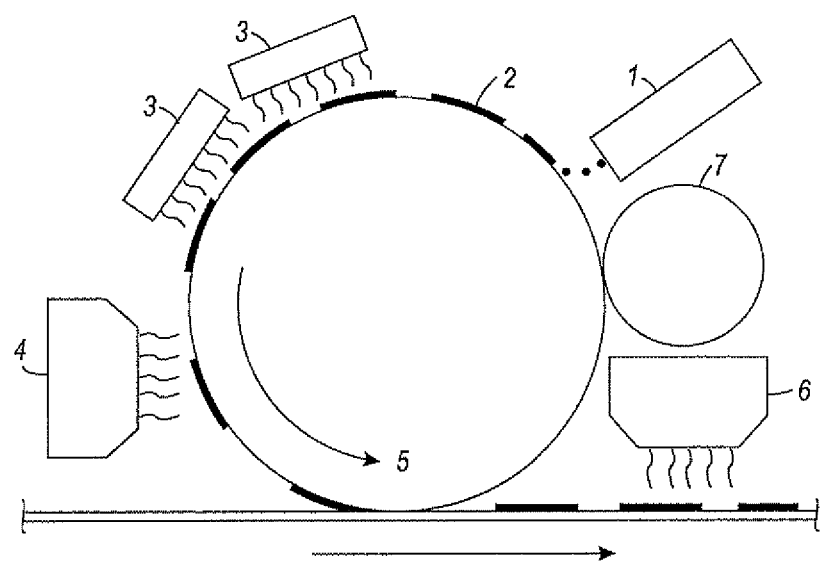

EMULSIFIED CURABLE OLIGOMER-BASED INKS FOR INDIRECT PRINTING METHOD

TECHNICAL FIELD

The present disclosure is generally related to indirect printing methods, and more specifically, to ink compositions for use in indirect printing methods.

BACKGROUND

Indirect printing methods generally include a two-step printing process including applying ink imagewise onto an intermediate receiving member, such as a drum or a belt, using an inkjet printhead, and then transferring a transient image to a substrate. After the ink is applied imagewise onto the intermediate receiving member, the ink wets or spreads on the intermediate receiving member to form a transient image. The transient image undergoes a change in properties, such as partial or complete drying, thermal or photo-curing or gelation, and is then transferred to the substrate.

Inks for use in an indirect printing method are designed and optimized to be compatible with the different subsystems, i.e., jetting and transferring. Specifically, an ink used in indirect printing must have properties, such as surface tension, viscosity, and particle size, suitable for use in a piezoelectric inkjet printhead. The ink must also be able to wet the intermediate receiving member to form the transient image and to undergo a stimulus induced property change to release from the intermediate receiving member in the transfer step.

Particularly, inks suitable for use in indirect printing must meet specific sub-system requirements that are unique to the inkjet/transfix printing architecture. Two important properties include wetting and release properties. Currently, no ink exists that enables both wetting and transfer that enables high quality printing at high speeds. Generally, inks that display good wettability do not transfer well onto a substrate, and conversely, inks that efficiently transfer to the substrate do not adequately wet the intermediate receiving member.

SUMMARY

Provided is a method of printing an image to a substrate comprising applying an aqueous inkjet ink onto an intermediate receiving member using an inkjet printhead; optionally spreading the ink onto the intermediate receiving member; inducing a property change of the ink; and transferring the ink to a substrate, wherein the ink comprises a curable oligomer.

Also provided is a method of printing an image to a substrate comprising applying an aqueous inkjet ink onto an intermediate receiving member using an inkjet printhead; optionally spreading the ink onto the intermediate receiving member; inducing a property change of the ink; and transferring the ink to a substrate, wherein making an aqueous inkjet ink comprising preparing a mixture curable oligomers, adding the curable oligomer mixture and a surfactant to a reactor containing a mixture of a humectant and an aqueous vehicle, creating an aqueous mixture, and homogenizing the aqueous mixture.

BRIEF DESCRIPTION OF THE DRAWING

The FIGURE is a schematic representation of a two-step printing process.

EMBODIMENTS

An aqueous inkjet ink comprising an emulsified curable oligomer has a number of advantages over inks that do not contain an emulsified curable oligomer. Using such an ink in a two-step printing process that includes applying the ink imagewise onto an intermediate receiving member and then transferring the ink from the intermediate receiving member to the substrate, results in an ink that displays both good wettability and good transferability while also providing a resulting image that is more robust than those resulting from inks that do not include an emulsified curable oligomer. After water is removed from the ink, the remaining curable oligomer may be exposed to radiation, such as UV light, and polymerized in the presence of a photoinitiator to form a robust final image. Printing to a transient substrate and removing the water before transfer to the final media reduces or removes negative effects on the final substrate, such as shrinkage and curl, that would be incurred if it was exposed to the high temperatures required for drying.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Indirect Printing

Images may be applied to a substrate using, for example, a two-step printing process. As shown in the FIGURE, the two step process includes applying an ink imagewise onto an intermediate receiving member, such as a drum or a belt, using an inkjet printhead 1, wetting/optionally spreading the ink on the intermediate receiving member to form the transient image 2, inducing a property change, such as partial or complete drying and gelation, in the transient image 3, optionally partially pre-curing the ink 4, transferring an image to the substrate 5, and curing to a robust final image 6. The process may further include cleaning the intermediate receiving member with a cleaning roll 7 after transferring the image to the substrate. An exemplary offset or indirect printing process is also disclosed in U.S. Pat. No. 5,389,958, the entire disclosure of which is incorporated herein by reference.

After the ink is jetted onto the intermediate receiving member, an aqueous portion of the ink vehicle may be removed with heat, leaving a curable oligomeric ink film behind. The residual ink may be optionally partially cured and transferred or transferred as dried to the desired, final substrate. After transfer, the ink may be cured to produce a robust image using UV light.

Ink Materials

An ink suitable for use in the above two-step printing process must have surface tension, viscosity, and particle size suitable for use in a piezoelectric inkjet printhead. Suitable values for the surface tension of jettable inks are typically from about 15 to about 50 dynes/cm, such as from about 15 to about 30 dynes/cm, from about 25 to about 40 dynes/cm, or from about 35 to about 50 dynes/cm. Suitable values for the viscosity of jettable inks are typically from about 2 to about 20 centipoise (cps), such as from about 2 to about 15 cps, from about 2 to about 12, from about 2 to about 11, from about 10 to about 16 cps, or from about 14 to about 20 cps, at the jetting temperature, which is below 60° C. Suitable values for the particle size of jettable inks are typically less than about 600 nm, less than about 550 nm, less than about 500 nm, or from about 50 nm to about 350 nm.

Suitable inks include inks containing an emulsified curable oligomer present in an amount of, for example, from about 3 to about 20 wt % based on the total weight of the ink, such as from about 3 to about 12 wt %, from about 10 to about 18 wt %, or from about 16 to about 20 wt %.

To aid in keeping the viscosity of the ink at a suitable level, suitable curable oligomers include those dispersible in the aqueous medium. The term dispersible refers to the even distribution of the oligomer throughout the medium, such as water, to form a stable suspension or colloid.

Suitable curable oligomers include oligomers that are insoluble or sparingly soluble in water, such as CN301, CN303, CN307, CN308, CN309, CN310, CN823, CN9014, CN9060, CN2102E, CN2264, CN2281, CN2283, CN2302, CN2930, CN821, CN822, CN823, CN9025, CN9026, CN9030, CN9031, CN9061, and CN9062, all commercially available from Sartomer.

The ink additionally includes an aqueous medium, such as water, a colorant, and at least one humectant. The ink may further comprise other additives, such as a surfactant, a photoinitiator, or a UV stabilizer.

Suitable classes of humectants include polyols, polyalkylene glycols, glycol ethers, lactams, sulfur-containing compounds, and the like. Specific examples of suitable humectants include 1,2-propanediol, 1,3-propanediol, 1,3-butanediol, 3-methyl-1,3-butanediol, 1,5-pentanediol, 1,6-hexanediol, 1,2,6-hexanetriol, glycerol, ethylene glycol, diethylene glycol, propylene glycol, butylene glycol, trimethylol propane, triethylene glycol, diethylene glycol methyl ether, triethylene glycol (mono) methyl ether, ethylene glycol diethyl ether, diethylene glycol ethyl ether, diethylene glycol diethyl ether, triethylene glycol ethyl ether, ethylene glycol isopropyl ether, ethylene glycol propyl ether, ethylene glycol butyl ether, diethylene glycol butyl ether, tripropylene glycol methyl ether, propylene glycol ethyl ether, propylene glycol butyl ether, dipropylene glycol dimethyl ether, polyethylene glycol, polyproylene glycol and copolymers of polyethylene glycol and polypropylene glycol, 2-pyrrolidone, 1-methyl-2-pyrrolidone, 1,5-dimethyl-2-pyrrolidone, 1-ethyl-2-pyrrolidone, 1-propyl-2-pyrrolidone, 1-isopropyl-2-pyrrolidone, 1-butyl-2-pyrrolidone, 1-(2-hydroxyethyl)-2-pyrrolidone, sulfolane, and mixtures thereof.

The choice of particular surfactants or combinations thereof, as well as the amounts of each to be used, is within the purview of those skilled in the art. Suitable surfactants include anionic, cationic, or nonionic surfactants in amounts of, for example, from about 0.01 to about 15 wt %, such as from about 0.01 to about 7 wt %, from about 6 to about 10 wt %, or from about 9 to about 15 wt %, based on a total weight of the ink.

Suitable anionic surfactants include sodium dodecylsulfate (SDS), sodium dodecylbenzene sulfonate, sodium dodecylbenzene sultanate, sodium dodecylnaphthalene sulfate, dialkyl benzenealkyl, sulfates and sulfonates, abitic acid, available from Aldrich, NEOGEN R™ and NEOGEN SC™ obtained from Kao, and the like.

Suitable cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, SANISOL B-50 available from Kao Corp., which consists primarily of benzyl dimethyl alkonium chloride, and the like.

Suitable nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy)ethanol, available from Rhone-Poulenac as IGEPAL CA-210™, IGEPAL CA-520™, IGEPAL CA-720™, IGEPAL CO 890™, IGEPAL CO-720™, IGEPAL CO-290™, IGEPAL CA-210™, ANTAROX 890™, ANTAROX 897™, and mixtures thereof.

Suitable colorants or pigments include pigments, dyes, mixtures of pigments and dyes, mixtures of pigments, mixtures of dyes, and the like. Suitable colorants comprise a pigment, a dye, mixtures thereof, carbon black, magnetite, black, cyan, magenta, yellow, red, green, blue, brown, mixtures thereof, in an amount of about 1 to about 25 wt % based upon the total weight of the ink, such as from about 1 to about 10 wt %, from about 8 to 17 wt %, or from about 15 to about 25 wt %. A pigment or colorant may be dispersed in the curable oligomer to form a pigment dispersion. Pigment dispersions are described, for example, in U.S. Patent Application Publication No. 2012/0123040, the entire disclosure of which is totally incorporated herein by reference.

Examples of suitable colorants include carbon black such as REGAL 330™; magnetites, such as Mobay magnetites MO8029™ and MO8060™; Columbian magnetites; MAPICO BLACKS™; and surface treated magnetites; Pfizer magnetites CB4799™, CB5300™, CB5600™, and MCX6369™; Bayer magnetites, BAYFERROX 8600™ and 8610™; Northern Pigments magnetites NP-604™ and NP-608™; Magnox magnetites TMB-100™ and TMB-104™; and the like.

Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostapetiii Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Examples of suitable pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like.

The ink compositions may optionally comprise an initiator to assist in curing the ink, such as a photoinitiator. Any known photoinitiator that initiates the free-radical reaction upon exposure to a desired wavelength of radiation, such as UV light, may be used. Suitable photoinitiators include photoinitiators that absorb radiation, such as UV light radiation, to initiate curing of the curable components. Suitable photoinitiators for ink compositions that are cured by free-radical polymerization, such as ink compositions containing acrylate groups or inks comprising polyamides, include benzophenones, benzoin ethers, benzyl ketals, α-hydroxyalkylphenones, α-alkoxyalkylphenones, α-aminoalkylphenones, and acylphosphine photoinitiators sold under the trade designations of IRGACURE and DAROCUR from BASF. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as BASF IRGACURE 819) and other acyl phosphines; 2-methyl-1-(4-methylthio)phenyl-2-(4-morpholinyl)-1-propanone (available as BASF IRGACURE 907) and 1-(4-(2-hydroxyethoxy) phenyl)-2-hydroxy-2-methylpropan-1-one (available as BASF IRGACURE 2959); 2-benzyl 2-dimethylamino 1-(4-morpholinophenyl)butanone-1 (available as BASF IRGACURE 369); 2-hydroxy-1-(4-(4-(2-hydroxy-2-methylpropionyl)-benzyl)-phenyl)-2-methylpropan-1-one (available as BASF IRGACURE 127); 2-dimethylamino-2-(4-methylbenzyl)-1-(4-morpholin-4-ylphenyl)-butanone (available as BASF IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl)propanone) (available as Esacure KIP 150 from Lamberti); 2-hydroxy-2-methyl-1-phenyl-1-propanone; benzyl-dimethylketal; and mixtures thereof. Suitable initiators additionally include amine synergists, which are co-initiators that donate a hydrogen atom to a photoinitiator and thereby form a radical species that initiates polymerization. Amine synergists may also consume oxygen dissolved in the ink, and because oxygen inhibits free-radical polymerization, its consumption increases the speed of polymerization. Suitable amine synergists include ethyl-4-dimethylaminobenzoate and 2-ethylhexyl-4-dimethylaminobenzoate.

Suitable UV stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10; GENORAD 16 and GENORAD 40 commercially available from Rahn AG, Zurich, Switzerland, and the like.

Preparing an Ink Containing a Curable Oligomer

Preparing an aqueous inkjet ink comprising a curable oligomer may be done by any suitable means. For example, preparing an aqueous inkjet ink may generally include preparing an oligomeric mixture, and then preparing the ink by creating an aqueous mixture by adding the oligomeric mixture and a surfactant to a reactor containing a mixture of humectant and an aqueous vehicle, heating and stirring the aqueous mixture, and homogenizing the aqueous mixture to form the ink.

Preparing the oligomeric mixture may include combining a curable oligomer, an optional photoinitiator, and an optional UV stabilizer to form a first mixture, stirring the first mixture at about 80° C., about 85° C., or about 90° C., for about 1 hour, or about 1.5 hours, or about 2 hours, and adding a pigment dispersion to the first mixture. The pigment dispersion may comprise, for example, a pigment dispersed in a curable oligomer in an amount of, for example, from about 1 to about 30 wt %, from about 1 to about 12 wt %, from about 10 to about 20 wt %, or from about 18 to about 30 wt %, based on a total weight of the dispersion. The resulting mixture may be stirred at about 80° C., about 85° C., or about 90° C., for an additional hour before cooling to room temperature.

Preparing the ink may include adding the oligomeric mixture and an anionic surfactant to a reactor containing a mixture of water and at least one humectant, heating the reactor to about 80° C., about 85° C., or about 90° C., and stirring the reactor at about 400 revolutions per minute (RPM), at about 450 RPM, or about 500 RPM, creating an aqueous mixture. The aqueous mixture may then be homogenized and cooled to form the ink.

Homogenizing the aqueous mixture may be done by any known method. For example, homogenizing may comprise pumping the aqueous mixture through a piston homogenizer at a rate of about 1 L/min, about 1.2 L/min, or about 1.4 L/min, for about 30 min, about 35 min, or about 40 min, with a primary homogenizing valve fully open and a secondary homogenizing valve partially closed, such that a homogenizing pressure is about 1000 psi, about 1100 psi, or about 1200 psi. Then, the homogenizing pressure may be increased to about 8000 psi, about 8200 psi, or about 8400 psi by partially closing the primary homogenizing valve. The aqueous mixture may then be circulated through the homogenizer and cooled to room temperature.

EXAMPLES

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

Preparation of Pigmented Oligomeric Mixture

CN 301 (10 wt %, 100 g), Irgacure 379 (0.3 wt %, 3 g), Irgacure 819 (0.05 wt %, 0.5 g), Esacure KIP150 (0.4 wt %, 4 g), and Irgastab UV10 (0.02 wt %, 0.2 g) is combined and stirred at 90° C. for 1 hour. To this solution is added the pigment dispersion (10.0 wt %, 100 g), and the resulting mixture is stirred at 90° C. for an additional hour before cooling to room temperature.

Preparation of Ink Formulation A

The pigmented oligomeric mixture described above (20.8 wt %. 207.7 g) and NEOGEN RK™ anionic surfactant comprising primarily branched sodium dodecyl benzenene sulphonate (2.0 wt %, 20 g) are added to deionized water (43.2 wt % 432 g), sulfalone (28.3 wt %, 283 g), and 2-pyrrolidinone (5.7 wt %, 57 g) in a reactor, heated to 90° C., and stirred at about 400 RPM. The aqueous mixture containing the insoluble oligomer is then pumped through a Gaulin 15MR piston homogenizer at about 1 L/min for a period of about 30 min with the primary homogenizing valve full open and the secondary homogenizing valve partially closed, such that the homogenizing pressure is about 1,000 psi. Then the primary homogenizing valve is partially closed, such that the homogenizing pressure increases to about 8,000 psi. The reaction mixture is kept at about 90° C. and circulated through the homogenizer at about 1 L/min for about 60 minutes. Thereafter, the homogenizer is stopped, and the reactor mixture is cooled to room temperature at about 15° C. per minute and discharged into a product container. The ink formulation is summarized in Table 1.

TABLE 1

Ink Formulation

| Component | Function | Wt % |
|---|---|---|
| CN301 | Curable oligomer | 10.0 |
| Irgacure 379 | Photoinitiator | 0.3 |
| Irgacure 819 | Photoinitiator | 0.05 |
| Esacure KIP150 | Photoinitiator | 0.4 |
| Irgastab UV10 | UV Stabilizer | 0.02 |
| Pigment dispersion (20% pigment in CN301) | Colorant | 10.0 |
| Deionized water | Vehicle | 43.2 |
| NEOGEN RK ™ | Surfactant | 2.0 |
| Sulfolane (5% water) | Humectant | 28.3 |
| 2-pyrrolidinone | Humectant | 5.7 |

Ink Formulation A will have a suitable viscosity (5-20 cps) and surface tension (20-22 dynes/cm) for jetting.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of printing an image to a substrate comprising:
applying an aqueous inkjet ink onto an intermediate receiving member using an inkjet printhead;
optionally spreading the ink onto the intermediate receiving member;
inducing a property change of the ink; and
transferring the ink to a substrate,
wherein:
the ink comprises a curable oligomer, and further wherein oligomer loading in the ink is from about 3 to about 20 wt % based on a total weight of the ink.

2. The method of claim 1, wherein the ink has a surface tension of from about 15 to about 50 dynes/cm.

3. The method of claim 1, wherein the ink has a viscosity of from about 2 to about 20 centipoise at about 30° C.

4. The method of claim 1, wherein the curable oligomer is dispersible in an aqueous medium.

5. The method of claim 1, wherein the ink further comprises a photo initiator.

6. The method of claim 1, wherein the ink further comprises a UV stabilizer.

7. The method of claim 1, wherein the ink further comprises at least one humectant.

8. The method of claim 1, further comprising curing the ink after transferring the ink to the substrate.

9. The method of claim 1, further comprising pre-curing the ink before transferring the ink to the substrate.

10. A method of printing an image to a substrate comprising:
applying an aqueous inkjet ink onto an intermediate receiving member using an inkjet printhead;
optionally spreading the ink onto the intermediate receiving member;
inducing a property change of the ink; and
transferring the ink to a substrate,
wherein:
making the ink comprises:
preparing a mixture of curable oligomers;
adding the curable oligomer mixture and a surfactant to a reactor containing a mixture of a humectant and an aqueous vehicle, to form an aqueous mixture;
heating and stirring the aqueous mixture; and
homogenizing the aqueous mixture.

11. The method of claim 10, wherein the curable oligomer mixture is pigmented.

12. The method of claim 10, wherein preparing the curable oligomer mixture comprises:
combining a curable oligomer, an optional photoinitiator, and an optional UV stabilizer to form a first mixture; and
adding a pigment dispersion to the first mixture.

13. The method of claim 10, wherein the curable oligomer is dispersible in an aqueous medium.

14. The method of claim 10, wherein the pigment dispersion comprises a pigment dispersed in a curable oligomer in an amount of about 20 wt % based on a total weight of the dispersion.

15. The method of claim 10, wherein homogenizing the aqueous mixture comprises:
pumping the aqueous mixture through a piston homogenizer with a primary homogenizing valve fully open and a secondary homogenizing valve partially closed, such that a homogenizing pressure is about 1000 psi;
increasing the homogenizing pressure to about 8000 psi by partially closing the primary homogenizing valve;
circulating the aqueous mixture through the homogenizer; and
cooling the aqueous mixture to room temperature.

16. The method of claim 10, wherein the aqueous inkjet ink contains an oligomer loading of from about 3 to about 20 wt % based on a total weight of the aqueous inkjet ink.

17. The method of claim 10, wherein the aqueous inkjet ink has a surface tension of from about 15 to about 50 dynes/cm.

18. The method of claim 10, wherein the aqueous inkjet ink has a viscosity of from about 2 to about 20 centipoise at about 30° C.

19. The method of claim 10, further comprising pre-curing the ink before transferring the ink to the substrate.

* * * * *